United States Patent
Burleigh (10) Patent No.: US 10,997,636 B2
(45) Date of Patent: May 4, 2021

(54) DELAY-TOLERANT INFORMATION-CENTRIC NETWORKING (DTICN)

(71) Applicant: California Institute of Technology, Pasadena, CA (US)

(72) Inventor: Scott C. Burleigh, Pasadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 372 days.

(21) Appl. No.: 15/648,272

(22) Filed: Jul. 12, 2017

(65) Prior Publication Data

US 2018/0018713 A1  Jan. 18, 2018

Related U.S. Application Data

(60) Provisional application No. 62/363,757, filed on Jul. 18, 2016.

(51) Int. Cl.
*G06Q 30/02* (2012.01)
*G06F 16/2453* (2019.01)
(Continued)

(52) U.S. Cl.
CPC ..... *G06Q 30/0277* (2013.01); *G06F 16/2453* (2019.01); *G06F 16/958* (2019.01);
(Continued)

(58) Field of Classification Search
CPC ........... G06Q 30/2051; G06Q 30/0277; G06F 16/00; G06F 16/958; G06F 16/957;
(Continued)

(56) References Cited

U.S. PATENT DOCUMENTS

| | | | | |
|---|---|---|---|---|
| 6,487,538 B1* | 11/2002 | Gupta | ................... | G06Q 30/02 705/14.66 |
| 8,204,060 B2* | 6/2012 | Jacobson | .............. | H04L 45/748 370/392 |
| 2003/0149737 A1* | 8/2003 | Lambert | ................. | H04L 29/06 709/214 |
| 2004/0162871 A1* | 8/2004 | Pabla | .................... | H04W 8/005 709/201 |

(Continued)

OTHER PUBLICATIONS

"Delay-tolerant networking", Wikipedia, https://en.wikipedia.org/wiki/Delay-tolerant_networking, as downloaded May 17, 2017, pp. 1-5.

(Continued)

*Primary Examiner* — Glenton B Burgess
*Assistant Examiner* — Rachel J Hackenberg
(74) *Attorney, Agent, or Firm* — Gates & Cooper LLP (57) ABSTRACT

A method and system provide the ability to distribute content on a network. A network system of nodes is established. Each node hosts a repository daemon (RD). A data source node receives a bundle that includes a payload and a digest extension that includes metadata that characterizes an application data unit (ADU) encapsulated by the payload. A local RD of the data source node caches the received bundle and publishes an advertisement (that includes the digest extension block) for the received bundle. The local RD, of a data requesting node subscribes to advertisements, receives an expression of interest (EOI), searches the published advertisements for a matching advertisement that matches the EOI, and obtains the bundle corresponding to the matching advertisement.

22 Claims, 6 Drawing Sheets

(51) Int. Cl.
  *G06F 16/958* (2019.01)
  *H04L 12/725* (2013.01)
  *H04L 12/717* (2013.01)
(52) U.S. Cl.
  CPC ........ *G06Q 30/0251* (2013.01); *H04L 45/306* (2013.01); *H04L 45/42* (2013.01)
(58) Field of Classification Search
  CPC .............. G06F 16/954; G06F 16/9574; G06F 16/9577; G06F 16/9535; G06F 16/953; G06F 16/951; G06F 16/908; G06F 16/909; G06F 16/2453; G06F 16/635; G06F 16/90335; G06F 16/3322
  See application file for complete search history.

(56) References Cited

U.S. PATENT DOCUMENTS

| | | | |
|---|---|---|---|
| 2012/0023418 A1* | 1/2012 | Frields | G06Q 10/101 715/756 |
| 2015/0078378 A1* | 3/2015 | Wijnands | H04L 12/1886 370/390 |
| 2016/0100311 A1* | 4/2016 | Kumar | H04L 63/123 726/7 |

OTHER PUBLICATIONS

Burleigh, S., "CBHE-Compatible Bundle Multicast draft-burleigh-dtnrg-imc-00", Network Working Group, Internet-Draft, Nov. 2012, pp. 1-13, https://tools.ietf.org/html/draft-burleigh-dtnrg-imc-00, as downloaded Jun. 22, 2017.
"Named Data Networking", Wikipedia, https://en.wikipedia.org/wiki/Named_data_networking, as downloaded May 17, 2017, pp. 1-10.
Ahlgren, B., et al., "A Survey of Information-Centric Networking", Information-Centric Networking, IEEE Communications Magazine, Jul. 2012, pp. 26-36.
Cerf, V., et al., "Delay-Tolerant Networking Architecture", Network Working Group, Apr. 2007, pp. 1-36, https://tools.ietf.org/html/rfc4838, as downloaded Jun. 24, 2017.
Scott, K., et al., "Bundle Protocol Specification", Network Working Group, Nov. 2007, https://tools.ietf.org/html/rfc5050, pp. 1-51, as downloaded Jun. 24, 2017.
Session I.1 Information-Centric Networking (ICN), Future Internet Assembly, http://future-internet.eu/home/future-internet-assembly/budapest-may-2011/final-plenary-session-research-needs-for-cloud-computing.html, as downloaded Nov. 10, 2017, pp. 1-3.

* cited by examiner

DELAY-TOLERANT INFORMATION-CENTRIC NETWORKING (DTICN)

CROSS-REFERENCE TO RELATED APPLICATIONS

This application claims the benefit under 35 U.S.C. Section 119(e) of the following and commonly-assigned U.S. provisional patent application(s), which is/are incorporated by reference herein:

Provisional Application Ser. No. 62/363,757, filed on Jul. 18, 2016, with inventor(s) Scott C. Burleigh, entitled "Delay-Tolerant Information-Centric Networking (DTICN)."

STATEMENT REGARDING FEDERALLY SPONSORED RESEARCH AND DEVELOPMENT

The invention described herein was made in the performance of work under a NASA contract NNN12AA01C, and is subject to the provisions of Public Law 96-517 (35 USC 202) in which the Contractor has elected to retain title.

BACKGROUND OF THE INVENTION

1. Field of the Invention

The present invention relates generally to the Internet, and in particular, to a method, apparatus, system, and article of manufacture that provides delay-tolerant information-centric networking (DTICN).

2. Description of the Related Art

The Internet is more widely and heavily used for the distribution of content through the World Wide Web, often to multiple recipients, many of which may be mobile devices, than for any other purpose. To enable access to such content, the user must know the location of the content, send a request to that location, and receive the content back as a response from that location. Accordingly, search engines allow the user to search for content and in response, the particular location of such content is provided via clickable links. However, since the distribution of content is the primary purpose, it makes sense to optimize Internet operations for efficient propagation based on the nature of content rather than on the content's specific current and intended locations. This general concept is sometimes termed Information Centric Networking (ICN).

A number of architectures have been proposed to enable ICNs, including Data-Oriented Network Architecture (DONA), Content Centric Networking (CCN), Publish-Subscribe Internet Routing Paradigm (PSIRP), and Network of Information (NetInf) but are not in widespread operational use. The basic unifying concept for all of the different proposed architectures provides that data objects are named (i.e., a user requests content based on an object's name rather than by location). Further, to enable security, the name of a data object must somehow enable cryptographic protection of the object's integrity and possibly guarantee its authenticity. In addition, data issuance, requisition, routing, and forwarding are performed on the basis of the object names. Lastly, data are cached not only at the edges of the network but at nodes in the interior of the network as well. These ICN based architectures further provide a "rendezvous point" (or a relay point), where information is located about what data is available and where the content is located, which informs users/requestors of such information and requests the data source to send content to the rendezvous point or to the user/requestor.

Various advantages results from ICN based architectures. For example, due to caching and aggregation, content distribution is scalable and efficient. In addition, the identify of a data object is preserved regardless of the locations at which copies reside at any moment. Further, the integrity and authenticity of each data object are preserved not only in transit but also at rest, at each cache point. ICN architectures are also location independent, and accordingly, the mobility and the multi-homing of data sources and requestors is easily accommodated. Such ICN systems are also disruption tolerant such that there is no need to sustain end-to-end connected transport sessions (i.e., store/carry/forward works).

While ICN based architectures have been explored in depth, they are not yet in widespread operational use.

At the same time as ICN based architectures are being investigated/explored, research has also been conducted with respect to delay-tolerant networks (DTN). In particular, some types of electronic communication networks are characterized by very long signal propagation latencies (e.g., undersea acoustic links), frequent transient network partitions (e.g., smartphones that go out of range of service towers), or both (e.g., deep space mission operations). More specifically, such problems exist in sensor-based networks using scheduled intermittent connectivity, terrestrial wireless networks that cannot ordinarily maintain end-to-end connectivity, satellite networks with moderate delays and periodic connectivity, and underwater acoustic networks with moderate delays and frequent interruptions due to environmental factors. For these networks, the Internet protocols don't work well. The internet architecture assumes uninterrupted end-to-end connectivity and very brief round-trip communication times. However, such electronic communications networks are occasionally-connected networks that may suffer from frequent partitions, disruption and disconnection and high-delay.

To overcome/tolerate the above-described problems such as long round trip times and delays, delay-tolerant networking (DTN) was developed to enable automated network communications to be extended to such problematic networks. Examples of DTN architectures/proposals include the RFC 4838, Delay-Tolerant Networking Architecture by V. Cerf, S. Burleigh, A. Hooke, L. Torgerson, R. Durst, K. Scott, K. Fall, and H. Weiss (April 2007), and RFC 5050, further defined in the Bundle Protocol Specification by K. Scott and S. Burleigh (November 2007), from the network working group of the IETF (Internet Engineering Task Force), which are incorporated by reference herein. In particular, DTN makes applications over disrupted networks robust and provide an opportunity to solve fundamental problems that weren't possible before using network-managed persistence. In this regard, the multicast capabilities of DTN enable access to information by content or type rather than by network address (e.g., "I want maps for my area" instead of "I want to ftp to 192.168.4.17"). DTNs further retrieve data and provide the content to local users as requested, learn from actual network usage, employ in-network storage/caches, and use time-spanning security rather than location-spanning security.

While it may be possible that the "named data object" (NDO) model embraced by the ICN research community is correct, it is also possible that a DTN-based approach to ICN may be viable. In this regard, what is needed is an ability to utilize either an ICN or a DTN in order to accommodate problematic networks including networks that are characterized by very long signal propagation latencies, frequent transient network partitions, or both, in order to access data on the basis of its nature rather than its location.

SUMMARY OF THE INVENTION

Embodiments of the invention overcome the problems of the prior art by extending DTN to form an ICN architecture (DTICN). One difference between DTICN and most other ICN systems is that DTICN does not require that data objects to be named (i.e., no unique, persistent data object names). Instead, the distributed data objects are referred to as application data units (ADUs) that form the "payloads" of DTN "bundles". Bundles are uniquely identified but do not have names that are meaningful to users; bundles' ADUs are not identified in any way. Non-unique textual digests (also referred to metadata) characterize the payloads of uniquely identified DTN bundles.

Therefore, users never ask for individual data objects by name. Instead, a receiving user asserts an expression of interest (EOI)—essentially the sort of phrase one would enter into the search field of a search engine—and the DTICN framework automatically delivers to the user all past, present, and future DTN ADUs that satisfy the expression of interest.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and in which are shown, by way of illustration, several embodiments of the present invention. It is understood that other embodiments may be utilized and structural changes may be made without departing from the scope of the present invention.

Overview

In ordinary/prior art networking, a user asks for data via a multiway handshake. However, in a network with signal propagation latencies, transient network partitions, or both, it is undesirable to have any type of negotiation/handshake because of the delay. Accordingly, embodiments of the invention may build upon a DTN that uses a bundle protocol in which answers to potential questions that the server/source of the information may have are "bundled" with the request for information itself. Thus, the user/requestor can send a message to a source of information and wait for the data/content back (e.g., fire and forget). In this regard, the bundle protocol provides the ability to exchange large bundles/packets between network nodes separated by lengthy round-trip delays.

Figure 1:
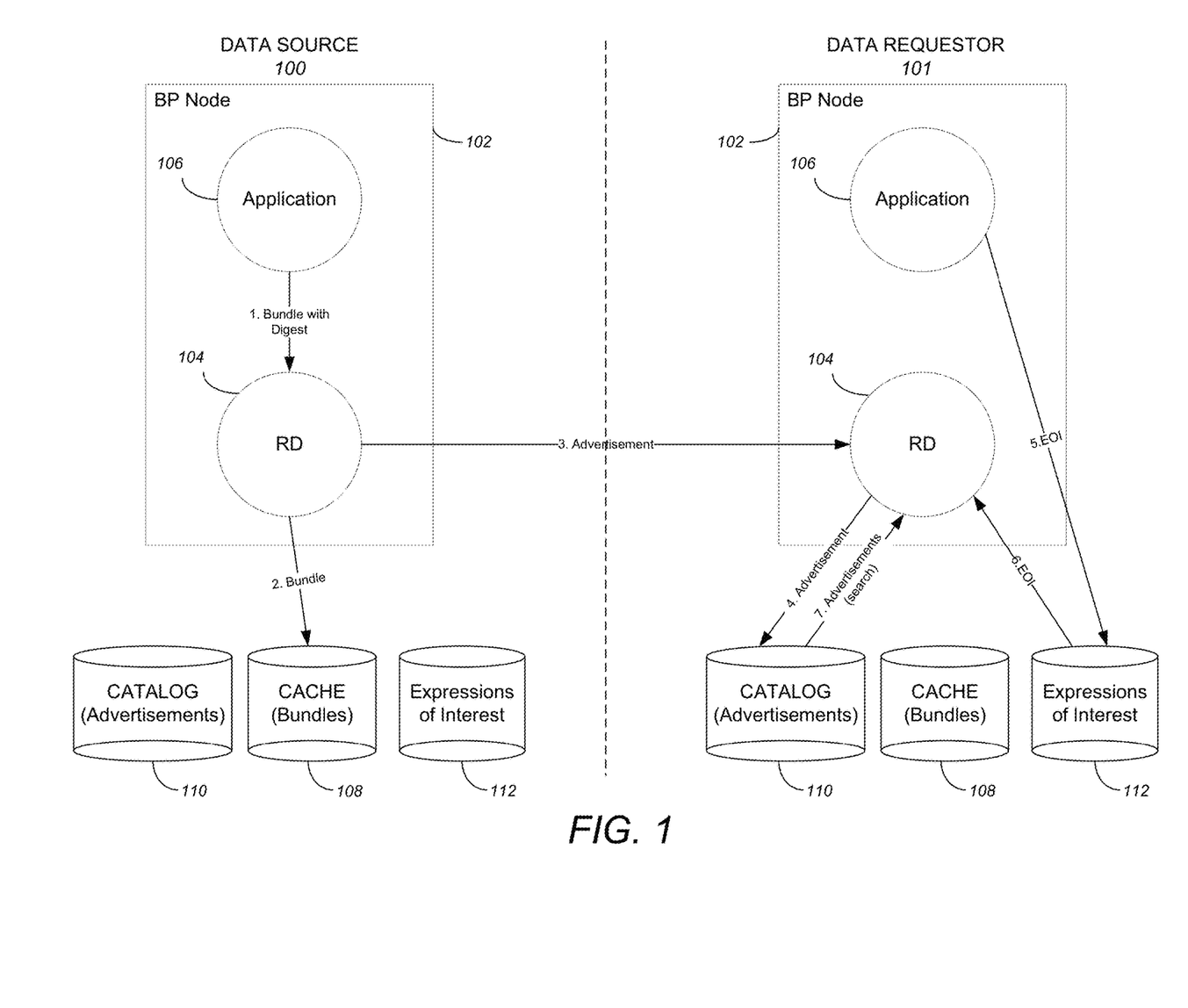
FIG. 1 illustrates the components and logical flow for enabling delay-tolerant information centric networking (DTICN) in accordance with one or more embodiments of the invention.

FIG. 1 illustrates the components and logical flow for enabling delay-tolerant information centric networking (DTICN) in accordance with one or more embodiments of the invention.

One or more embodiments of the invention provide DTICN bundles that have digest extension blocks that consist of metadata including the title of a data object, which need not be unique. Nodes 102 (also referred to as bundle protocol [BP] nodes) have local repository daemons (RDs) 104 that manage the ICN. In order to insert a bundle into the ICN, a data source 100 (e.g., via application 106) sends the bundle, including the digest, to the local RD 104 (step 1), which caches it (step 2) in cache 108. The RD 104 then publishes an advertisement for each such bundle it receives (i.e., step 3), containing the bundle's digest, ADU size, and expiration time and noting the multicast group to join in order to receive a copy. Every RD 104 (e.g., in Data Sources 100 and Data Requestors 101) subscribes to advertisements and remembers them in a catalog 110 (i.e., step 4).

Data requestors 101 post (via application 106) (step 5) expressions of interest 112 (EOIs, i.e., search phrases) locally (e.g., in a linked list within non-volatile storage). The RD 104 at each node 102 notes (step 6) each new expression of interest, and uses the EOIs to search through the catalog 110 (i.e., step 7). For each matching advertisement, if the associated bundle is already cached locally (e.g., within cache 108), then the RD 104 simply delivers the bundle to the requesting application 106. Otherwise, the RD 104 obtains the associated bundle from the network.

Figure 2:
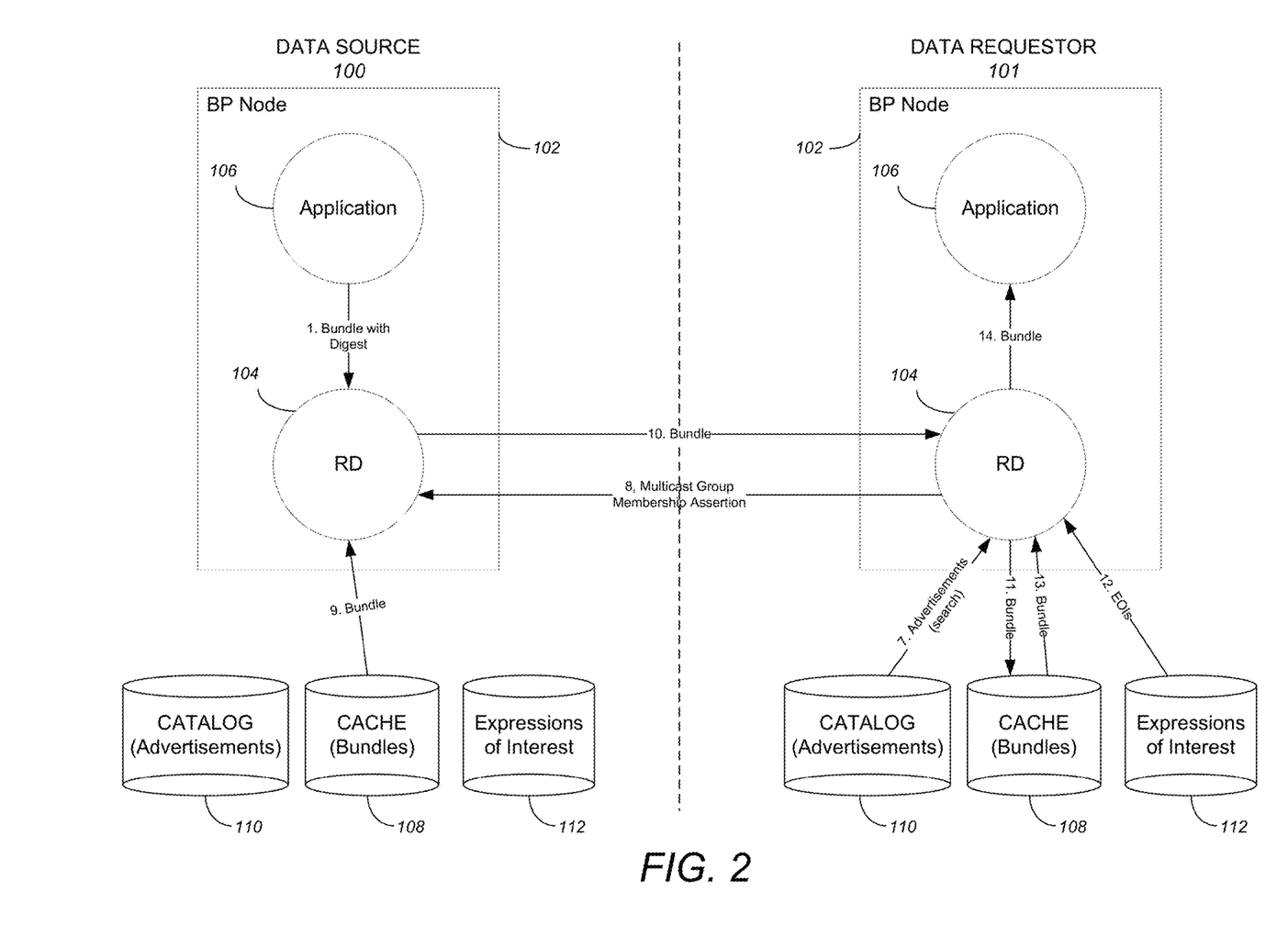
FIG. 2 illustrates the components and process for obtaining a bundle from a network in accordance with one or more embodiments of the invention.

FIG. 2 illustrates the components and process for obtaining a bundle from a network. To obtain a bundle from the network, the node 102 joins the associated multicast group noted in the advertisement (i.e., step 8 multicast group membership association). This causes multicast membership to be propagated until it reaches a node 102 whose RD 104 has cached (i.e., in Cache 108) the associated bundle. The RD 104 retrieves the bundle from cache 108 (e.g., step 9). That node's RD 104 forwards a copy of the bundle toward the new group member (i.e., step 10), simulating original multicast publication of the bundle. Whenever a node 102 relays a DTICN bundle, the receiving node's RD 104 caches it (e.g., in cache 108) (i.e., step 11). Further, whenever a data bundle is delivered to the RD 104 of a node 102 that is a member of the bundle's multicast group, the RD 104 caches the bundle and delivers it to all current requesting application(s) 106 according to the current list of EOIs. In other words, the RD 104 retrieves the list of EOIs 112 (i.e., step 12), retrieves any matching bundles from cache 108 (i.e., step 13), and delivers the bundles to the requesting application 106 (i.e., step 14).

Figure 3:
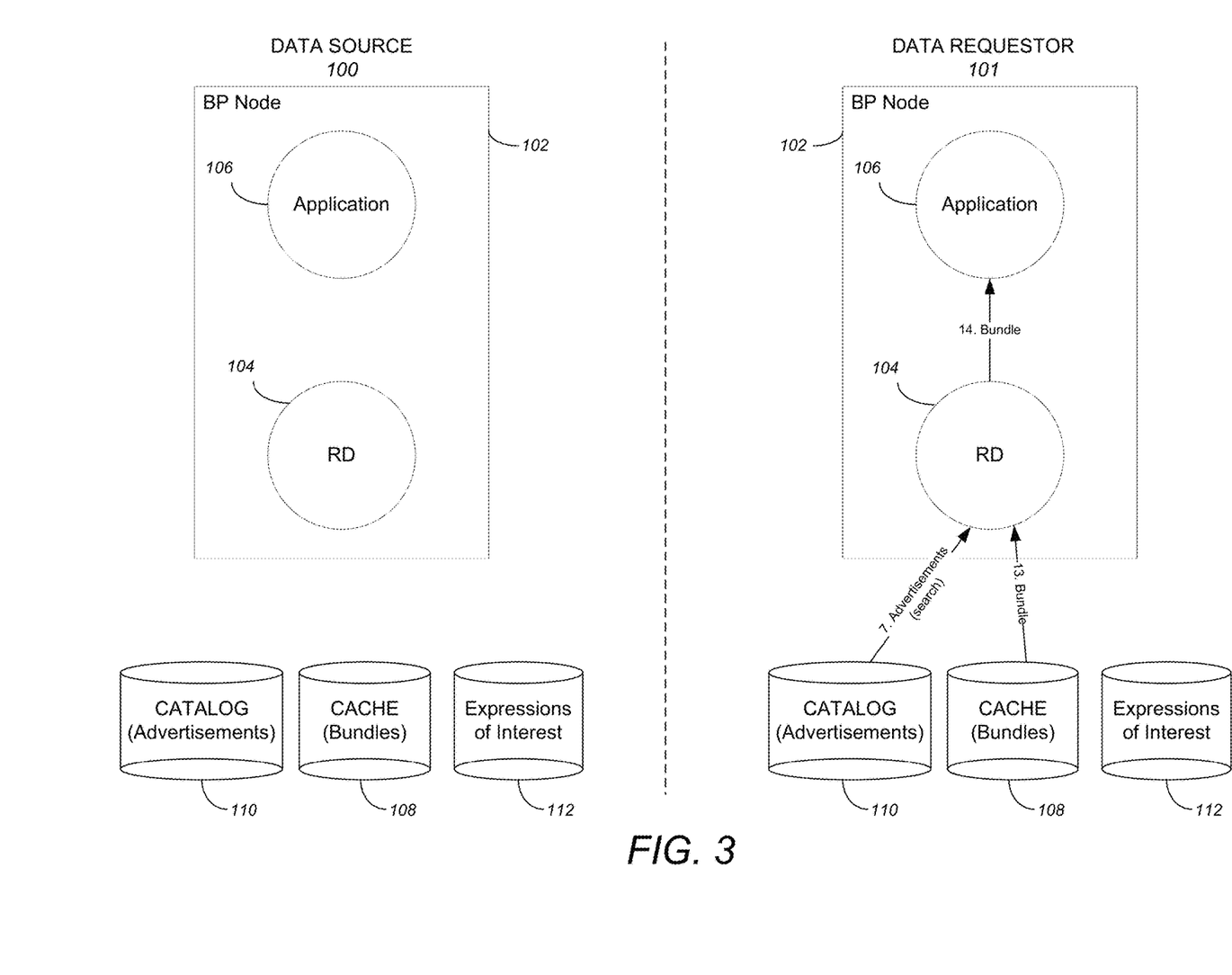
FIG. 3 illustrates the components and process when the bundle is located in local cache in accordance with one or more embodiments of the invention.

FIG. 3 illustrates the components and process when the bundle is located in local cache in accordance with one or more embodiments of the invention. As illustrated, and described above, the RD 104 at each node 102 uses the EOIs 112 to search through the catalog 110 (i.e., step 7). For each matching advertisement, if the associated bundle is already cached locally (e.g., within cache 108), then the RD 104 simply retrieves the bundle from local cache 108 (step 13) and delivers the bundle to the requesting application 106 (step 14). Otherwise, the RD 104 obtains the associated bundle from the network (as described above with respect to FIG. 2).

Each of the different components utilized in the process described in FIGS. 1-3 are described in detail below.

Bundle Protocol Overview

As described above, a bundle protocol may be used to enable data content/object distribution. Each bundle consists of some number of blocks—a primary block, a payload block, and any number of extension blocks. The primary block consists of the header that includes to/from information and basic networking parameters. The payload block is the data content/object being sent. Extension blocks are between the primary and payload blocks and consist of a variety of attributes that may include digital signatures, metadata, quality of service indicators, etc. In one or more embodiments of the invention, a specific DTICN extension block is provided and consists of metadata that is an abstract of the data.

Further to the above, embodiments of the invention do not require that data objects be named (i.e., no unique, persistent data object names). Instead, the distributed data objects are referred to as application data units (ADUs, forming the "payloads" of DTN "bundles"). Bundles are uniquely identified but do not have names that are meaningful to users; the ADUs that form bundles' payloads are not identified in any way. Non-unique textual digests (i.e., metadata) characterize the payloads of uniquely identified DTN bundles.

Thus, instead of using names for data objects, metadata that is an abstract/fundamental expression of the nature of the object is attached to the object and is multicast through the system/network, resulting in subsequent multicast of the object itself to anyone who expresses an interest in it upon receiving the metadata. If nobody is subscribing to the multicast group, each node that receives a copy of the object and metadata holds onto the object and metadata in case someone subscribes at a later date/time.

DTICN Metadata Extension Block

Each DTICN bundle whose destination is the community of DTICN user applications contains a newly defined DTICN metadata extension block that contains a "digest"—a textual structure that characterizes the ADU in terms that users are likely to find meaningful. The metadata also includes a descriptive title. In other words, DTICN bundles have digest extension blocks that consist of metadata that includes the title.

DTICN Advertisement Administrative Record

A new type of bundle protocol administrative record is defined whose payload cites some bundle-specific DTICN multicast group number and contains the metadata, payload size, and expiration time of the corresponding DTICN bundle.

Static Endpoints

DTICN relies on bundle multicast for data distribution. one element of this reliance is the establishment of one or more new application multicast groups for "DTICN Advertisement" administrative bundles. Each DTICN-enabled node registers in at least one such multicast endpoint, identified by a well-known "imc" ("interplanetary multicast") endpoint ID string (a reserved multicast group number and service number pair).

Also, each DTICN-enabled node registers in its own local unicast DTICN repository endpoint, that is identified by a single well-known "ipn" ("InterPlanetary Net") endpoint ID string (local node number, "Repository" service number).

Non-Volatile Data Structures

A list of Advertisements—"the Catalog"—is added to the node's non-volatile data store. The Catalog contains all DTICN Advertisement administrative records that have been received at the node. Catalog entries are removed from the list at the time of expiration of the bundles to which they refer.

A list of locally "cached" bundles—"the Cache"—is added to the node's non-volatile data store. The Cache contains all bundles that are retained at the local node in expectation that a DTICN application may at some point wish to receive their payloads. Cached bundles are eventually removed from the Cache either by standard, automatic BP bundle expiration or by "accelerated expiration" initiated to avert Cache space exhaustion.

A list of all EOI objects is added to the node's non-volatile data store. Each EOI object contains the EOI itself, a list of bundles awaiting delivery whose payloads have been determined to satisfy the EOI, a semaphore that is given whenever a new bundle is appended to that list, and a list of all DTICN Data multicast group numbers corresponding to bundles that were ever appended to that list.

A list of EOI service requests, requesting that a new EOI be added to or removed from the EOI objects list, is also added to the node's non-volatile data store.

Repository Daemon (RD) and DTICN User Applications

A repository service is added to the administrative element of the node's application agent. Specifically, a Repository Daemon (RD) is started on the node. The repository service daemon pends on ("opens") both the repository endpoint and at least one DTICN Advertisement endpoint. It also waits for new requests to be appended to the EOI requests list.

A DTICN user application that wishes to consume data invokes library functions to post and rescind EOIs. These functions append EOI requests to the list of EOI requests.

When the RD receives a request to add a new EOI:
(1) the RD constructs an EOI object from the request and appends it to the list of EOI objects;
(2) the RD passes a handle to the new EOI object back to the requesting user application so that the application can pend on the delivery of bundles that satisfy the EOI (another library function);
(3) the RD identifies all bundles that are already locally cached whose metadata matches the EOI (maybe none). For this purpose, the RD executes an embedded search engine (e.g., either an open-source or commercial search engine product). For each identified bundle, the RD delivers the bundle to the application that issued the request: it appends the bundle to the new EOI object's list of bundles whose payloads have been determined to satisfy the EOI, appends the bundle's corresponding DTICN Data multicast group number to the EOI object's list of multicast group numbers, and gives the new EOI object's semaphore; and
(4) the RD identifies all DTICN Advertisement records in the Catalog whose metadata matches the EOI and whose DTICN multicast group number identifies a DTICN Data multicast endpoint (a) that is not the destination of any bundle currently in the Cache and (b) within which the local node is not currently registered. For each such record, the RD registers the local node in the DTICN Data multicast endpoint identified by the record's DTICN multicast group number. This results in propagation of a multicast endpoint membership assertion, throughout the multicast distribution tree, in the usual way.

A DTICN user application that wishes to produce data simply requests transmission of a bundle (including a metadata block) to the repository endpoint of the local node.

When a bundle is delivered at the repository unicast endpoint, the RD receives the bundle and proceeds as follows:

(1) the RD invents a new DTICN multicast group number—a randomly chosen, extremely large positive integer;

(2) the RD simulates reception of the bundle at a newly defined DTICN Data multicast ("imc") endpoint, identified by the new DTICN multicast group number and the well-known DTICN service number, as described below. (For this purpose, the RD acts as if the destination of the bundle were that endpoint.) The RD does so without registering the local node in that endpoint; and (3) the RD sources a new bundle whose payload is a DTICN Advertisement administrative record that cites the new DTICN group number and contains the delivered bundle's metadata, payload size, and expiration time. The new bundle's destination is a DTICN Advertisement multicast endpoint. (Possibly there is only one. Possibly a particular DTICN Advertisement multicast endpoint is selected on some implementation-specific basis.)

When a bundle is delivered at a DTICN Data multicast endpoint—or when such a bundle delivery is simulated as described above—the RD proceeds as follows:

(1) If this bundle is already in the Cache, the bundle is simply discarded; it is not forwarded any further within the multicast distribution tree. (This condition may arise when, for example, some other node elsewhere in the tree newly asserts membership in this endpoint.)

(2) Otherwise, the bundle's Metadata is matched against all EOIs in the list of EOI objects (e.g., using an embedded search engine). For each matching EOI, the RD delivers that bundle to the application that issued the EOI: it appends the bundle to the EOI object's list of bundles whose payloads have been determined to satisfy the EOI, it appends the bundle's corresponding DTICN Data multicast group number to the EOI object's list of multicast group numbers, and it gives the EOI object's semaphore.

(3) After performing all applicable multicast forwarding, the RD does not destroy the bundle but rather inserts the bundle into the Cache. This imposes an additional retention constraint on the bundle: cached bundles are not discarded until they expire, unless accelerated expiration is initiated to prevent Cache space exhaustion.

When a bundle is delivered at a DTICN Advertisement multicast endpoint—whether sourced locally or remotely—the RD proceeds as follows:

(1) It inserts the bundle's payload—a DTICN Advertisement record—into the Catalog;

(2) It matches the record's Metadata against all EOIs in the list of EOI objects (e.g., using an embedded search engine). If there is at least one matching EOI to which the bundle corresponding to the record's DTICN group number has not already been delivered, the RD registers the local node in the DTICN Data multicast endpoint identified by the record's DTICN multicast group number. This results in propagation of a multicast endpoint membership assertion, throughout the multicast distribution tree, in the usual way.

When a DTICN-enabled BP node receives a membership assertion for a DTICN Data multicast group of which it is already a member, propagation of the assertion ceases as usual. In addition, however, propagation of the assertion also ceases if the DTICN multicast bundle whose destination is the indicated multicast endpoint is cached locally. In that event, the multicast propagation service of the bundle protocol agent simply forwards—or re-forwards—that cached multicast bundle to its destination (the DTICN Data multicast group). The cached bundle may be fragmented, signed, encrypted, etc. in standard DTN fashion; it is the destination of the multicast bundle that accomplishes information-centric content propagation.

Note that accelerated expiration of cached bundles can cause a bundle to be removed from the Cache before the corresponding DTICN Advertisement is removed from the Catalog. A subsequently asserted EOI may therefore cause the RD to re-register the local node in in the DTICN Data multicast endpoint identified by the Advertisement record's DTICN multicast group number, ultimately resulting in the re-reception of the corresponding bundle so that it may be delivered to the requesting application.

These mechanisms cause every transmitted DTICN bundle's ADU and Metadata to be delivered eventually to all user applications that have posted—or subsequently post—matching EOIs.

When an EOI is rescinded, the corresponding EOI object is deleted.

Whenever a DTICN Advertisement is deleted from the Catalog (at the scheduled time of expiration of the associated bundle), the node is automatically unregistered from the DTICN Data endpoint identified by that record's DTICN multicast group number, if currently so registered.

DTICN Discussion and Analysis

The DTICN procedures accomplish the objectives of ICN while also providing all of the operational advantages of DTN.

ICN Objectives

As noted in an extensive body of research publications, Information-Centric Networking is intended to achieve the following objectives:

Scalable, cost-effective distribution of digital content, particularly video content, to multiple consumers. This content distribution may comprise 90% of all network traffic. By transmitting copies of content objects from nearby local caches, ICN reduces both latency in data delivery and the load on the trunk lines of the network.

Location-independent content requisition. The location from which content is transmitted is invisible to the consumer, so that location may change without affecting content delivery. This insulates the service from node mobility or node failure, and it enables parallel delivery of different portions of a content object from different locations; both performance and reliability are improved.

Content trust model. Security is applied to the content objects themselves, regardless of the locations from which they are transmitted.

DTICN's Advantages

DTICN achieves all of the objectives of ICN but does so in a manner that differs sharply from current ICN design practice, which is focused on Named Data Objects. Below are one or more of the advantages offered by DTICN:

Because DTICN doesn't name any data objects, consumers are not required to know object names in order to requisition content. Instead, they simply assert expressions of interest that are familiar "search" phrases.

NDO-based ICN approaches could, of course, be complemented by search servers that would deliver NDOs matching expressions of interest. However, those servers would need to function as "rendezvous points" at which NDOs would be cached and to which expressions of interest would be directed. Those rendezvous points would constitute critical infrastructure, handling a heavy computational load (responding to expressions of interest from a potentially large number of consumers). In contrast, the DTICN approach localizes search activity in the node that is local to the requisitioning consumer. This distributes the computational task, eliminates some network traffic (the flow of EOIs), and protects the privacy of consumers' expressions of interest. It also eliminates the transmission of content objects to cache (rendezvous) points that have not yet received any expressions of interest in those objects.

This last point contributes to a general advantage of DTICN: it is readily scalable to extremely large networks, in part because it's based on multicast. Strategies for selecting cache points are a challenging research topic in ICN. DTICN solves this by simply using BP multicast for content distribution and caching content at all multicast branch nodes through which the content passes on its way to initial consumers. Distribution from cache points over the multicast tree is always efficient and local.

DTICN is based on uniformly disruption-tolerant reliable transmission. Reliability in NDO-based ICN is a continuing research problem.

In DTICN, only content that is explicitly published—that is, sent to the Repository endpoint—is ever cached at DTICN nodes. Privately transmitted content is not inadvertently (perhaps illegally) distributed.

The problem of securing content rather than connections, which NDO-based ICN attempts to address by object naming rules, is solved comprehensively by the Bundle Security Protocol. Arbitrary levels of cross-domain authentication, confidentiality, and integrity assurance can be applied to any content, limiting each individual user's access to any content object as necessary.

Because DTICN is based on DTN, which coexists seamlessly with non-DTN traffic on the Internet, there are no conceptual obstacles to widespread deployment.

Logical Flow

Figure 4:
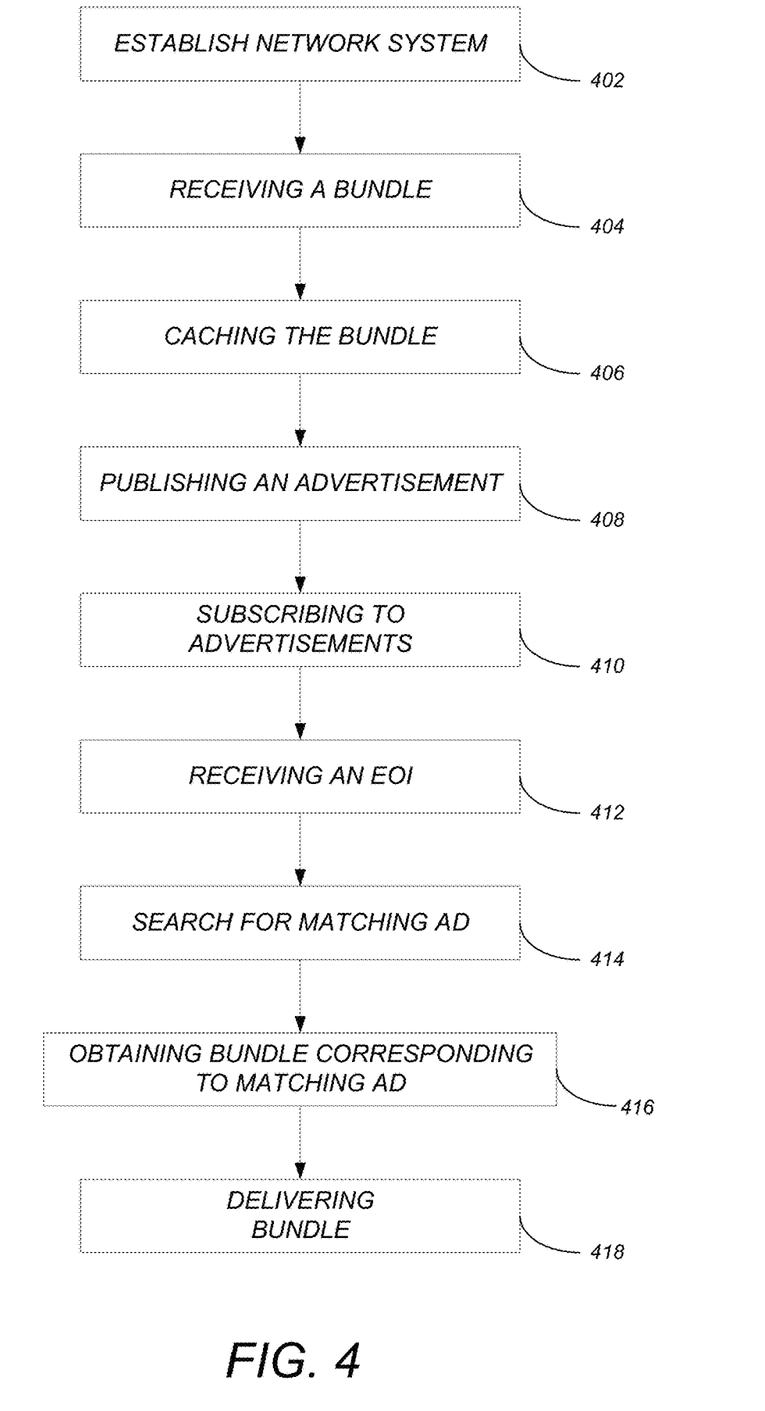
FIG. 4 illustrates the logical flow for distributing content on a network in accordance with one or more embodiments of the invention.

FIG. 4 illustrates the logical flow for distributing content on a network in accordance with one or more embodiments of the invention.

At step 402, a DTICN network system that includes one or more nodes is established. Each node hosts a repository daemon (RD) (and an application). The RD hosted by a specific node is referred to as a local node to the specific node. The nodes include a data source node and a data requesting node. Each node may also maintain/host a local catalog, a local cache, and a local list of expressions of interest (EOIs) (all of which may be maintained in a non-volatile data structure). The EOIs may be search phrases. Further, each of the EOIs may be an EOI object that includes a record of bundles awaiting delivery whose payloads have been determined to satisfy the EOI, a record of multicast group numbers corresponding to bundles that were appended to the record of bundles.

At step 404, the data source node receives a bundle (of one or more bundles). Each bundle includes a payload block of the content and a digest extension block. The digest extension block includes metadata that characterizes the application data unit (ADU) encapsulated by the payload block.

At step 406, the local RD, hosted by the data source node, caches the received bundle.

At step 408, the local RD, hosted by the data source node, publishes an advertisement for the received bundle. Such an advertisement includes the digest extension block (e.g., metadata in the bundle's digest extension block). Further, such an advertisement may also include a size of the payload block, an expiration time, and information about a multicast group to join to receive a copy of the bundle. The expiration time determines when to remove the advertisement from the catalog based on a time of expiration of the bundle (i.e., the expiration time of the corresponding bundle).

At step 410, each of the RDs (or the local RD of the data requesting node) subscribes to advertisements (e.g., via an advertisement multicast group).

At step 412, the local RD, of the data requesting node, receives an expression of interest (EOI) (e.g., that may be a search phrase).

At step 414, the local RD, of the data requesting node, searches the published advertisements for a matching advertisement that matches the EOI.

At step 416, the local RD, of the data requesting node, obtains the bundle corresponding to the matching advertisement (from the local RD of the data source node).

At step 418, the local RD (of the data requesting node) delivers the bundle that corresponds to the matching advertisement. In this step if the bundle is in the local cache, the local RD simply delivers the bundle from cache. However, if the bundle is not in local cache, the local RD obtains the bundle via the network.

In view of the above, the advertisement may note a multicast group to join to receive a copy of the received bundle. The local RD, hosted by the data requesting node, obtained the received bundle corresponding to the matching advertisement via the network from the data source node. To obtain the bundle (via the network) from the data source node, the local RD (of the data requesting node) joins the multicast group noted in the advertisement, which causes multicast membership to propagate until reaching the data source node (or a relay node) that has cached a copy of the bundle. Upon reaching the data source node (or the relay node) that has a locally cached copy of the bundle, the local RD (of the data source node or relay node with the cached copy), forwards a copy of the received bundle toward the data requesting node. Upon the local RD, of the data requesting node, receiving the received bundle, the local RD (of the data requesting node), delivers the received bundle per any EOIs that match the matching advertisement. Thus, relay nodes (between the data source node and the data requestor node) relay the copy of the bundle from the data source node to the data requesting node. Whenever a bundle is received at a node that hosts an RD, the local RD caches the bundle in the cache. At the same time, whenever a bundle is delivered to the RD of a node that is a member of the bundle's multicast group, the local RD delivers the bundle to all current requesting applications hosted on that node based on the local list of EOIs.

Further to the above, in one or more embodiments of the invention, the local RD, of the data source node, catalogs the advertisements in a list of advertisements, caches the received bundle in a list of locally cached bundles, and maintains the EOI in a list of EOIs.

DTICN Internet Integration

Figure 5:
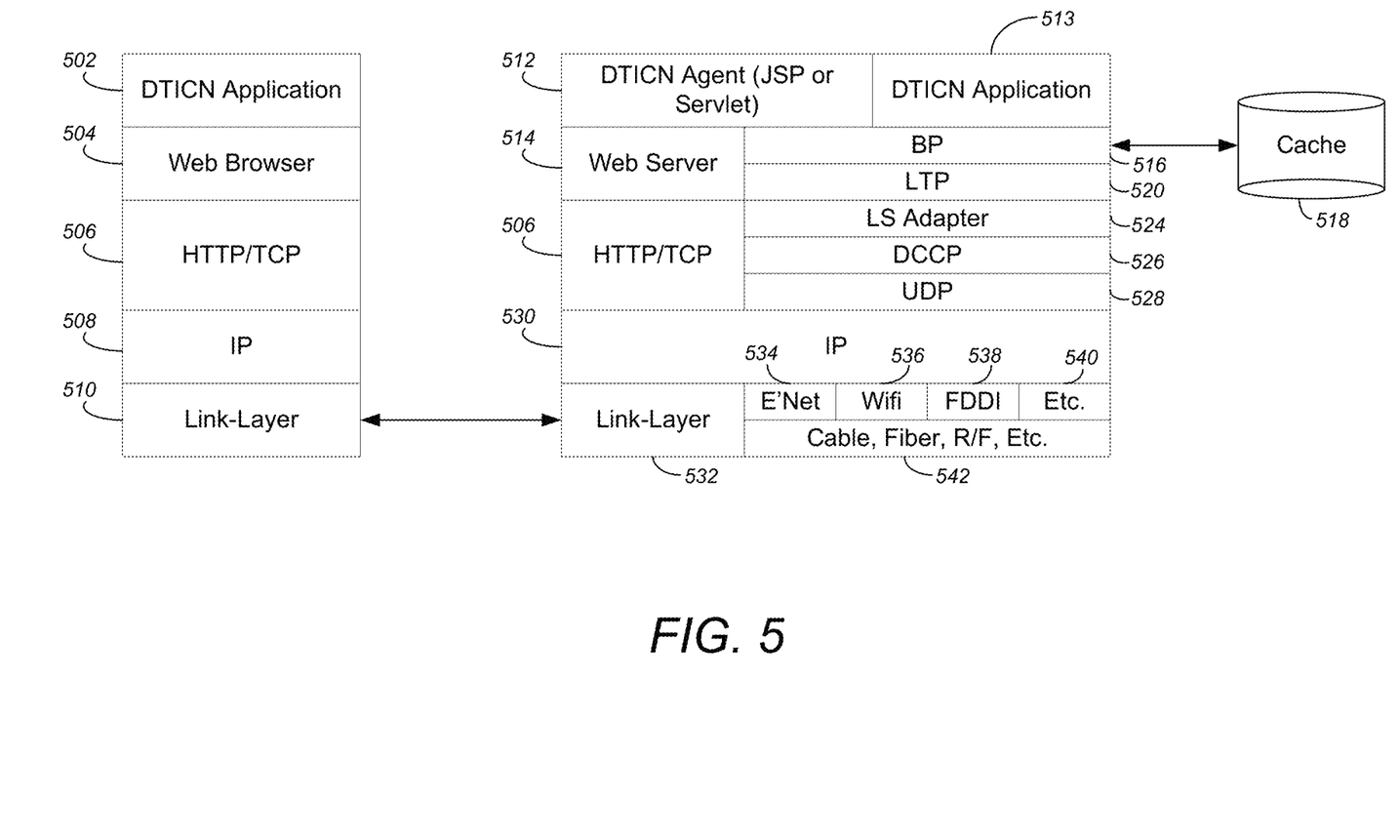
FIG. 5 illustrates a protocol stack that may be used to integrate/use the DTICN simultaneously with or as an extension to traditional Internet communications in accordance with one or more embodiments of the invention.

FIG. 5 illustrates a stack that may be used to integrate/use the DTICN simultaneously with or as an extension to traditional Internet communications. Use of the stack provides the ability for a user that does not have a DTICN enabled computer (e.g., a television set, set-top box, standard computer, etc.) to utilize a DTICN.

As illustrated, the DTICN application 502 may execute as a plug-in and/or within a web browser 504. The different protocols that may be used to enable communication follow in the client stack (e.g., the HTTP/TCP [Hypertext transfer protocol/transfer control protocol] protocol 506 [the Application and transport layers], the IP protocol 508 [the Internet/Network layer], and the link-layer protocol 510). Accordingly, the DTICN application 502 would make a web browser 504 connection to a web server hosted on the same node or a remote node.

On the server side, you have the DTICN agent 512 that may be implemented as a Java Server Page (JSP) or as a servlet. In this regard, the implementation of the Java web page or whatever would utilize the bundle protocol stack can enable interaction with the Internet. The DTICN agent 512 would receive/interpret the HTTP and utilize the bundle protocol stack to perform the interaction with the network. Accordingly, an interface between the web browser 504 and the DTICN network is enabled. In particular, the DTICN agent 512 can talk to BP 516 via one interface and a DTICN application 502 via a different interface. The remaining elements in the stack enable such capabilities.

The DTICN agent 512 may utilize the bundle protocol 516 to retrieve a bundle from cache or another transport protocol such as Licklider Transmission Protocol (LTP) 520, which may use a DCCP link service adapter to exercise DCCP 526 over UDP 528 for congestion-controlled operation on the Internet. Further in the server stack is the IP 530 (internet protocol) layer, followed by link-layer 532 that services Ethernet 534, wifi 536, FDDI 538 (fiber distributed data interface), etc. 450, and Cable, fiber R/F, etc. 542 to enable physical communications.

As illustrated in FIG. 5, the web browser 504 can request data from the web server 514 that may then cause a DTICN agent 512 to retrieve the information using a bundle protocol and the DTICN system described above. Similarly, a user may simply request data via DTICN application 502 (e.g., without specifying a data object name/location) in/via a web browser, and the web browser can communicate with a web server 514 to utilize the DTICN system to retrieve the information (e.g., via cache 518 or by retrieving the data content/objects via the DTICN network system. In other words, the user may express interest in application data by entering a search expression in a DTICN Application 502 or web browser 504. As application data items satisfying that search expression arrive, they are queued for the user's consumption, like emails. Such application data items may be delivered from nearby caches 518 if previously pushed, or may be delivered by push as generated/published. Further, DTICN Application 513 may access DTICN services without utilizing the world-wide web.

Hardware Embodiments

Figure 6:
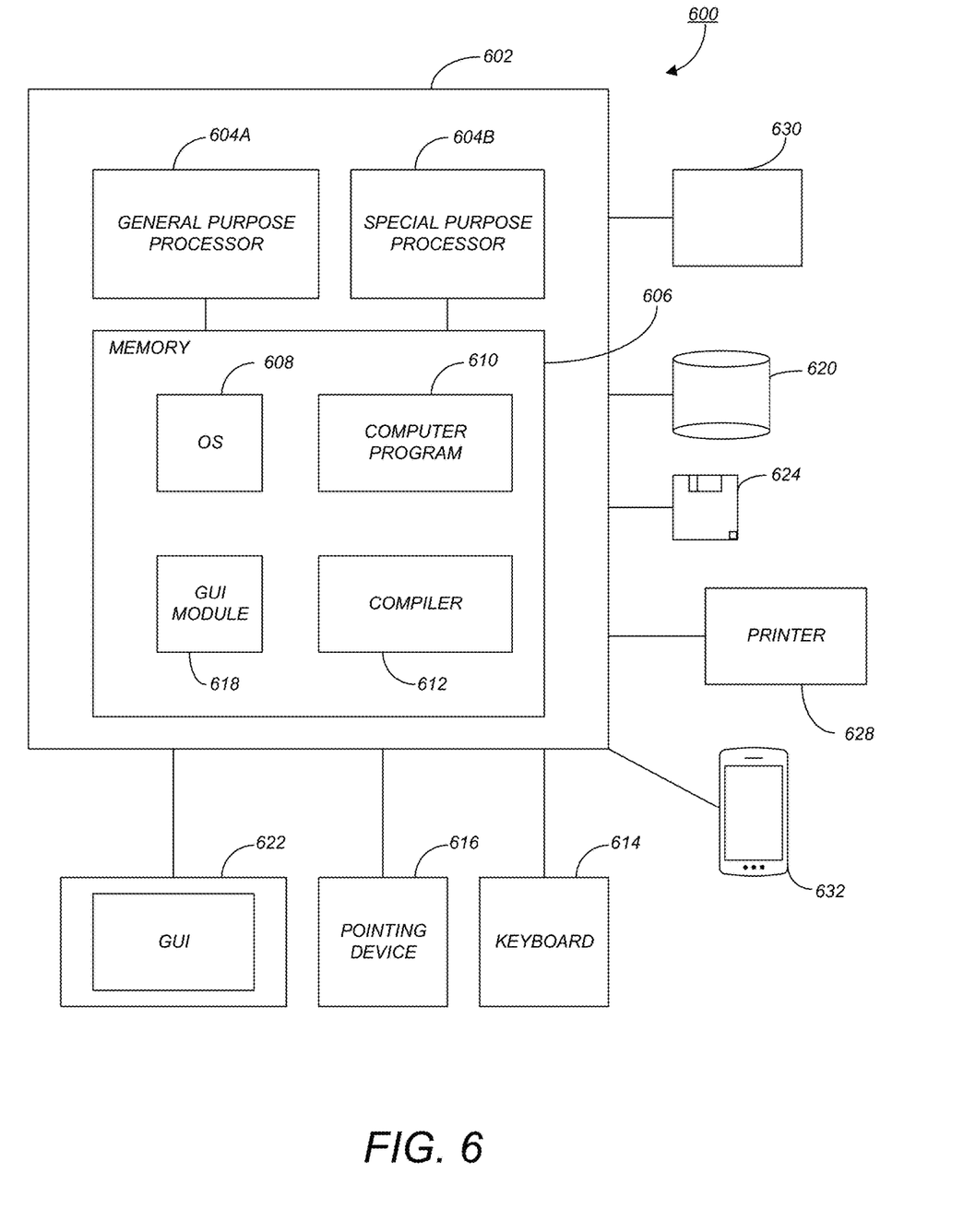
FIG. 6 is an exemplary hardware and software environment used to implement one or more embodiments of the invention.

FIG. 6 is an exemplary hardware and software environment 600 used to implement one or more embodiments of the invention. The hardware and software environment includes a computer 602 and may include peripherals. Computer 602 may be a user/client computer, server computer, or may be a database computer. The computer 602 comprises a general purpose hardware processor 604A and/or a special purpose hardware processor 604B (hereinafter alternatively collectively referred to as processor 604) and a memory 606, such as random access memory (RAM). The computer 602 may be coupled to, and/or integrated with, other devices, including input/output (I/O) devices such as a keyboard 614, a cursor control device 616 (e.g., a mouse, a pointing device, pen and tablet, touch screen, multi-touch device, etc.) and a printer 628. In one or more embodiments, computer 602 may be coupled to, or may comprise, a portable or media viewing/listening device 632 (e.g., an MP3 player, IPOD, NOOK, portable digital video player, cellular device, personal digital assistant, etc.). In yet another embodiment, the computer 602 may comprise a multi-touch device, mobile phone, gaming system, internet enabled television, television set top box, or other internet enabled device executing on various platforms and operating systems.

In one embodiment, the computer 602 operates by the general purpose processor 604A performing instructions defined by the computer program 610 under control of an operating system 608. The computer program 610 and/or the operating system 608 may be stored in the memory 606 and may interface with the user and/or other devices to accept input and commands and, based on such input and commands and the instructions defined by the computer program 610 and operating system 608, to provide output and results.

Output/results may be presented on the display 622 or provided to another device for presentation or further processing or action. In one embodiment, the display 622 comprises a liquid crystal display (LCD) having a plurality of separately addressable liquid crystals. Alternatively, the display 622 may comprise a light emitting diode (LED) display having clusters of red, green and blue diodes driven together to form full-color pixels. Each liquid crystal or pixel of the display 622 changes to an opaque or translucent state to form a part of the image on the display in response to the data or information generated by the processor 604 from the application of the instructions of the computer program 610 and/or operating system 608 to the input and commands. The image may be provided through a graphical user interface (GUI) module 618. Although the GUI module 618 is depicted as a separate module, the instructions performing the GUI functions can be resident or distributed in the operating system 608, the computer program 610, or implemented with special purpose memory and processors.

In one or more embodiments, the display 622 is integrated with/into the computer 602 and comprises a multi-touch device having a touch sensing surface (e.g., track pod or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD), portable/handheld game/music/video player/console devices (e.g., IPOD TOUCH, MP3 players, NINTENDO 3DS, PLAYSTATION PORTABLE, etc.), touch tables, and walls (e.g., where an image is projected through acrylic and/or glass, and the image is then backlit with LEDs).

Some or all of the operations performed by the computer 602 according to the computer program 610 instructions may be implemented in a special purpose processor 604B. In this embodiment, the some or all of the computer program 610 instructions may be implemented via firmware instructions stored in a read only memory (ROM), a programmable read only memory (PROM) or flash memory within the special purpose processor 604B or in memory 606. The special purpose processor 604B may also be hardwired through circuit design to perform some or all of the operations to implement the present invention. Further, the special purpose processor 604B may be a hybrid processor, which includes dedicated circuitry for performing a subset of functions, and other circuits for performing more general functions such as responding to computer program 610 instructions. In one embodiment, the special purpose processor 604B is an application specific integrated circuit (ASIC).

The computer 602 may also implement a compiler 612 that allows an application or computer program 610 written in a programming language such as C, C++, Assembly, SQL, PYTHON, PROLOG, MATLAB, RUBY, RAILS, HASKELL, or other language to be translated into processor 604 readable code. Alternatively, the compiler 612 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 610 accesses and manipulates data accepted from I/O devices and stored in the memory 606 of the computer 602 using the relationships and logic that were generated using the compiler 612.

The computer 602 also optionally comprises an external communication device such as a modem, satellite link, Ethernet card, or other device for accepting input from, and providing output to, other computers 602.

In one embodiment, instructions implementing the operating system 608, the computer program 610, and the compiler 612 are tangibly embodied in a non-transitory computer-readable medium, e.g., data storage device 620, which could include one or more fixed or removable data storage devices, such as a zip drive, floppy disc drive 624, hard drive, CD-ROM drive, tape drive, etc. Further, the operating system 608 and the computer program 610 are comprised of computer program 610 instructions which, when accessed, read and executed by the computer 602, cause the computer 602 to perform the steps necessary to implement and/or use the present invention or to load the program of instructions into a memory 606, thus creating a special purpose data structure causing the computer 602 to operate as a specially programmed computer executing the method steps described herein. Computer program 610 and/or operating instructions may also be tangibly embodied in memory 606 and/or data communications devices 630, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 602.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

In summary, embodiments of the invention provide a system for distributing content on a network. In particular, as described above, embodiments provide a multicast based DTN system that overcomes issues with long propagation delays in networks. More specifically, embodiments of the invention provide an extension to the DTN architecture that achieves the objectives of ICN with no conceptual obstacles to deployment, as embodiments of the invention may be designed for seamless integration with the Internet.

To enable the above, instead of using names for data objects, objects are not named and metadata (that is an abstract/fundamental expression describing the nature of the object) is attached to the object and multicast through the network system. If nobody has yet expressed interest in the object as characterized by its metadata, the information is still maintained until or in case such an eventuality occurs. The concept of bundles in a bundle protocol are used to exchange information between nodes. Further, a spanning tree may underlay an entire network and is configured without loops in a fairly static manner. Every node in a spanning tree that wants to subscribe to the multicast, may express interest in a particular multicast group (e.g., by specifying a simple multicast number). Such a subscription is then propagated throughout the network.

More specifically, repository daemons (RDs) cache bundles and manage all advertisements and EOIs. In this regard, every RD may receive from a local application a bundle intended for DTICN distribution, extract the metadata/digest from the bundle and publish the metadata/digest in an "advertisement" to a defined multicast group (to which all other RDs subscribe). Further, each RD maintains a catalog of advertisements (wherein each advertisement also includes a multicast group identifier) and a list of EOIs. When a new EOI is received (e.g., from a local application), the RD searches the local cache for a matching bundle and delivers it to the requesting application if found. If the bundle is not in local cache, the RD searches the catalog for a match. In addition, the EOI is stored in the list of EOIs. In addition, if not in local cache, the RD joins the multicast group that is associated with a matching entry in the catalog of advertisements (e.g., based on the multicast group identifier). By joining the multicast group, the request for that bundle propagates until it reaches a node that contains the bundle in local cache, and the bundle is then relayed to the requesting node.

Advantages/achievements of embodiments of the invention include repository structures that enable a scalable and efficient content distribution thanks to caching and aggregation. Further, bundle protocol security preserves integrity and authenticity of each bundle not only in transit but also at rest, at each cache point. DTN late binding further ensures that mobility and multi-homing of data sources and requestors is easily accommodated. In addition, DTN is innately disruption-tolerant. With respect to the extension blocks provided by embodiments of the invention, there are no namespace issues—EOIs are just search phrases. All "rendezvous" (i.e., search) activity occurs in the node that is local to the requisitioning consumer. Such local based activity then distributes the computational task as widely as possible, eliminates some network traffic (the flow of EOIs), protects the privacy of consumer's expressions of interest, and ensures that there is no transmission of content objects to cache (rendezvous) points that have not yet received any expressions of interest in those objects. In addition, the selection of cache points is easy and automatic, transmission is reliable, and there is no chance of privately transmitted data being inadvertently published. Further, the configuration and replication of data enables reliable transmission at various nodes throughout a network. In this regard, if there is data loss at any particular node, the most recent hop or prior node in a path may be used to obtain a copy of the corrupted/lost bundle.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for distributing content on a network, comprising:
   (a) establishing a network system comprising one or more nodes, wherein:
      (1) each node hosts a repository daemon (RD), wherein the RD hosted by a specific node, of the one or more nodes, is a local RD to the specific node;
      (2) one of the one or more nodes comprises a data source node;
      (3) one of the one or more nodes comprises a data requesting node;
   (b) the data source node receiving a bundle of one or more bundles, wherein:
      (1) each of the one or more bundles comprises a payload block of the content and a digest extension block;
      (2) the digest extension block comprises metadata that characterizes an application data unit (ADU) encapsulated by the payload block; and
      (3) the metadata comprises an abstract of the content in the payload block;
   (c) the local RD, of the data source node, caching the received bundle;
   (d) the local RD, of the data source node, publishing an advertisement for the received bundle, wherein the advertisement comprises the digest extension block;
   (e) the local RD, of the data requesting node, subscribing to advertisements, wherein once subscribed, published advertisements are received at the local RD of the data requesting node;
   (f) the local RD, of the data requesting node, storing the received advertisements in a catalog of advertisements;
   (g) the local RD, of the data requesting node, receiving a new expression of interest (EOI) locally from a data requesting user;
   (h) the local RD, of the data requesting node, in response to receiving the new EOI, searching the catalog of advertisements for a matching advertisement that matches the new EOI, and wherein search results are used in subsequent processing, and wherein the searching is localized in the local RD, wherein the local RD is local to the data requesting node, and wherein the localized searching protects a privacy of the new EOI;
   (i) the local RD, of the data requesting node, obtaining the bundle corresponding to the matching advertisement, from the local RD, of the data source node; and
   (j) the local RD, of the data requesting node, delivering the bundle corresponding to the matching advertisement in satisfaction of the new EOI.

2. The computer-implemented method of claim 1, wherein the local RD, of the data requesting node, delivering the bundle comprises:
   delivering the bundle corresponding to the matching advertisement from a cache of the data requesting node when the bundle corresponding to the matching advertisement is in the cache of the data requesting node; and
   obtaining the bundle corresponding to the matching advertisement via the network when the bundle corresponding to the matching advertisement is not in the cache of the data requesting node.

3. The computer-implemented method of claim 1, wherein the advertisement further comprises:
   a size of the payload block;
   an expiration time; and
   information about a multicast group to join to receive a copy of the received bundle.

4. The computer-implemented method of claim 3, wherein the expiration time determines when to remove the advertisement from the catalog based on a time of expiration of the received bundle.

5. The computer-implemented method of claim 1, wherein each of the RDs subscribes to advertisements via an advertisement multicast group.

6. The computer-implemented method of claim 1, wherein the new EOI comprises a search phrase.

7. The computer-implemented method of claim 1, wherein:
   (a) the advertisement notes a multicast group to join to receive a copy of the received bundle;
   (b) the local RD, hosted by the data requesting node, obtaining the received bundle corresponding to the matching advertisement via the network from the data source node by:
      (1) the local RD, of the data requesting node, joining the multicast group noted in the advertisement, wherein the joining causes multicast membership to propagate until reaching the data source node or a relay node, of the one or more nodes, that has cached a copy of the bundle;
      (2) upon reaching the data source node or the relay node that has cached a copy of the received bundle, the local RD of the data source node or of the relay node that has cached a copy of the received bundle forwarding a copy of the received bundle toward the data requesting node;
      (3) upon the local RD, of the data requesting node, receiving the received bundle, the local RD of the data requesting node, delivering the received bundle per any EOIs that match the matching advertisement.

8. The computer-implemented method of claim 1, wherein the new EOI comprises an EOI object, and the EOI object comprises:
   a record of bundles awaiting delivery whose payloads have been determined to satisfy the EOI; and
   a record of multicast group numbers corresponding to bundles that were appended to the record of bundles.

9. The computer-implemented method of claim 1, wherein:
   the local RD, of the data source node, catalogs the advertisement in a list of advertisements;
   the local RD, of the data source node, caches the received bundle in a list of locally cached bundles; and
   the local RD, of the data source node, maintains the new EOI in a list of EOIs.

10. The computer-implemented method of claim 1, wherein each node maintains the catalog of advertisements, a cache, and a list of EOIs in a non-volatile data structure.

11. A system for distributing content on a network, comprising:
   (a) one or more nodes that communicate with each other on the network, wherein:
      (1) one of the one or more nodes comprises a data source node;
      (2) one of the one or more nodes comprises a data requesting node; and
      (3) each node comprises a memory and a processor for executing various operations;
   (b) a repository daemon (RD) hosted by each node of the one or more nodes, wherein:
      (1) the RD hosted by a specific node, of the one or more nodes, is a local RD to the specific node;
      (2) each of the RDs subscribes to advertisements;
   (c) the data source node:
      (1) receives a bundle of one or more bundles;
      (2) each of the one or more bundles comprises a payload block of the content and a digest extension block;
      (3) the digest extension block comprises metadata that characterizes an application data unit (ADU) encapsulated by the payload block; and
      (4) the metadata comprises an abstract of the content in the payload block;
   (d) a local RD of the data source node:
      (1) caching the received bundle; and
      (2) publishing an advertisement for the received bundle, wherein the advertisement comprises the digest extension block; and
   (e) a local RD of the data requesting node:
      (1) subscribing to advertisements, wherein once subscribed, published advertisements are received at the local RD of the data requesting node;
      (2) storing the received advertisements in a catalog of advertisements;
      (3) receiving a new expression of interest (EOI) locally from a data requesting user;
      (4) in response to the receiving the new EOI, searching the catalog of advertisements for a matching advertisement that matches the new EOI, and wherein search results are used in subsequent processing, and wherein the searching is localized in the local RD, wherein the local RD is local to the data requesting node, and wherein the localized searching protects a privacy of the new EOI;
      (5) obtaining the bundle corresponding to the matching advertisement, from the local RD, of the data source node; and
      (6) delivering the bundle corresponding to the matching advertisement in satisfaction of the new EOI.

12. The system of claim 11, wherein the local RD of the data requesting node delivers the bundle by:
   delivering the bundle corresponding to the matching advertisement from a cache of the data requesting node when the bundle corresponding to the matching advertisement is in the cache of the data requesting node; and
   obtaining the bundle corresponding to the matching advertisement via the network when the bundle corresponding to the matching advertisement is not in the cache of the data requesting node.

13. The system of claim 11, wherein the advertisement further comprises:
   a size of the payload block;
   an expiration time; and
   information about a multicast group to join to receive a copy of the received bundle.

14. The system of claim 13, wherein the expiration time determines when to remove the advertisement from the catalog based on a time of expiration of the received bundle.

15. The system of claim 11, wherein each of the RDs subscribes to advertisements via an advertisement multicast group.

16. The system of claim 11, wherein the new EOI comprises a search phrase.

17. The system of claim 11, wherein:
   (a) the advertisement notes a multicast group to join to receive a copy of the received bundle;
   (b) the local RD, hosted by the data requesting node, obtaining the received bundle corresponding to the matching advertisement via the network from the data source node by:
      (1) the local RD, of the data requesting node, joining the multicast group noted in the advertisement, wherein the joining causes multicast membership to propagate until reaching the data source node or a relay node, of the one or more nodes, that has cached a copy of the bundle;
      (2) upon reaching the data source node or the relay node that has cached a copy of the received bundle, the local RD of the data source node or of the relay node that has cached a copy of the bundle forwarding a copy of the received bundle toward the data requesting node;
      (3) upon the local RD, of the data requesting node, receiving the received bundle, the local RD of the data requesting node, delivering the received bundle per any EOIs that match the matching advertisement.

18. The system of claim 11, wherein the new EOI comprises an EOI object, and the EOI object comprises:
   a record of bundles awaiting delivery whose payloads have been determined to satisfy the new EOI;
   a record of multicast group numbers corresponding to bundles that were appended to the record of bundles.

19. The system of claim 11, wherein:
   the local RD, of the data source node, catalogs the advertisement in a list of advertisements;
   the local RD, of the data source node caches the received bundle in a list of locally cached bundles; and
   the local RD, of the data source node, maintains the new EOI in a list of EOIs.

20. The system of claim 11, wherein each node maintains the catalog of advertisements, a cache, and a list of EOIs in a non-volatile data structure.

21. The computer-implemented method of claim 1, further comprising:
   (k) the local RD, of the data requesting node, in response to receiving the new EOI, storing the received new EOI in a list of EOIs;
   (l) the local RD, of the data requesting node, in response to receiving a new advertisement, searching the list of EOIs for a matching EOI that matches the new advertisement, and wherein search results are used in subsequent processing;
   (m) the local RD, of the data requesting node, obtaining the bundle corresponding to the new advertisement that matches one or more of the EOIs in the list of EOIs, from the local RD, of the data source node; and (n) the local RD, of the data requesting node, delivering the bundle corresponding to the new advertisement in satisfaction of the matching EOI.

22. The system of claim 11, wherein
(e) the local RD, of the data requesting node:
  (7) in response to receiving the new EOI, stores the received new EOI in a list of EOIs;
  (8) in response to receiving a new advertisement, searching the list of EOIs for a matching EOI that matches the new advertisement, and wherein search results are used in subsequent processing;
  (9) obtaining the bundle corresponding to the new advertisement that matches one or more of the EOIs in the list of EOIs, from the local RD, of the data source node; and
  (10) delivering the bundle corresponding to the new advertisement in satisfaction of the matching EOI.

\* \* \* \* \*